United States Patent
Tseng

(10) Patent No.: US 7,621,490 B2
(45) Date of Patent: Nov. 24, 2009

(54) HEIGHT ADJUSTABLE HOLDING APPARATUS

(75) Inventor: Li-Tien Tseng, Bade (TW)

(73) Assignee: Qisda Corporation, Taoyuan County (TW)

( * ) Notice: Subject to any disclaimer, the term of this patent is extended or adjusted under 35 U.S.C. 154(b) by 0 days.

(21) Appl. No.: 12/040,061

(22) Filed: Feb. 29, 2008

(65) Prior Publication Data

US 2008/0210841 A1 Sep. 4, 2008

(30) Foreign Application Priority Data

Mar. 2, 2007 (TW) .............................. 96107063 A

(51) Int. Cl.
*F16M 11/00* (2006.01)
(52) U.S. Cl. ..................... 248/157; 248/404; 248/422; 248/917
(58) Field of Classification Search ................ 248/422, 248/157, 161, 676, 132, 404, 332, 917, 919; 361/681, 682
See application file for complete search history.

(56) References Cited

U.S. PATENT DOCUMENTS

| | | | |
|---|---|---|---|
| 2003/0234332 A1* | 12/2003 | Yen et al. ..................... | 248/404 |
| 2006/0011788 A1* | 1/2006 | Jang ............................ | 248/132 |
| 2006/0219849 A1* | 10/2006 | Chiu ........................ | 248/125.8 |
| 2006/0237618 A1* | 10/2006 | Chiang ........................ | 248/404 |
| 2007/0045488 A1* | 3/2007 | Shin .......................... | 248/176.1 |
| 2007/0215776 A1* | 9/2007 | Chen et al. ................... | 248/404 |
| 2008/0099637 A1* | 5/2008 | Pai .............................. | 248/157 |

* cited by examiner

*Primary Examiner*—Ramon O Ramirez

(57) ABSTRACT

A height adjustable holding apparatus for supporting a display comprises a holding component, a moving component, an elastic component, an active component, a first rolling component, a driven component, a second rolling component, a first cable and a second cable. The moving component is movable along the holding component. The display is connected to the moving component and is movable along the holding component. The elastic component is disposed in one end of the holding component and is stretchable along the moving direction of the moving component. When the moving component generates a first displacement, the first cable drives the active component to rotate together with the driven component. The second rolling component rolls back the second cable and makes the elastic component to generate a second displacement smaller than the first displacement.

20 Claims, 14 Drawing Sheets

US 7,621,490 B2

HEIGHT ADJUSTABLE HOLDING APPARATUS

BACKGROUND OF THE INVENTION

1. Field of the Invention

The present invention relates generally to a height adjustable holding apparatus; concretely, the present invention relates to a height adjustable holding apparatus for supporting a displayer.

2. Description of the Prior Art

Displayer is one of the most accessible information products. Displayer is not only a necessary output terminal of a personal computer but also a medium of visual output for the reception of the signal of the TV programs and electronic games.

Human eyes are the receptor of the visual image of the displayer. In order to achieve the optimally visual effect and to prevent from the visual injuries and the uncomfortableness for a long time watching, the height of the displayer should be adjustable to fit the different visual angles. Besides, because of the different visual angles from the different persons, the height of the displayer should be adjustable.

Currently, the height of the displayer is adjusted by the holding component of the constant-force spring. Because the tensile force of the constant-force spring is not affected by the stretching length of the constant-force spring, the tensile force of the constant-force spring is not affected by the height of the displayer. Thus, the displayer can remain in its position after changing its height. However, because the material cost of the constant-force spring is higher than the general spring, the economy of the height adjustable holding apparatus may be improved.

SUMMARY OF THE INVENTION

It is an object of the present invention to provide a height adjustable holding apparatus for supporting an object.

It is another object of the present invention to provide a height adjustable holding apparatus to reduce the producing cost.

The height adjustable holding apparatus of the present invention for supporting a display includes a holding component, a moving component, an elastic component, an active component, a first rolling component, a driven component, a second rolling component, a first cable, and a second cable. The moving component is movable along the holding component. An object is connected to the moving component and is movable along the holding component. The elastic component is disposed in one end of the holding component and is stretchable along the moving direction of the moving component. The active component is disposed on the holding component. The first rolling component is disposed on the holding component, wherein the first rolling component rotates together with the active component and drives the active component. The driven component is disposed on the holding component, wherein the driven component rotates together with the active component. A second rolling component is disposed on the holding component, wherein the second rolling component rotates together with the driven component. One end of the first cable is connected to the moving component and the other end of the first cable is connected to the side of the first rolling component. The first rolling component is able to roll back the first cable. One end of the second cable is connected to a side of the second rolling component and the other end of the second cable is connected to the other end of the elastic component.

The first cable drives the active component to rotate together with the driven component when the moving component generates a first displacement, the second rolling component rolls back the second cable and makes the elastic component to generate a second displacement smaller than the first displacement. A product of a circumference of the active component being divided by a circumference of the first rolling component and a circumference of the second rolling component being divided by a circumference of the driven component is less than one in order to make the second displacement smaller than the first displacement.

The height adjustable holding apparatus further includes a speed-changing gear set, wherein the speed-changing gear set includes a speed-changing gear, each speed-changing gear has a major gear and a minor gear rotating together, each minor gear of the speed-changing gear engages with the major gear of the adjacent speed-changing gear, the major gear of the anterior speed-changing gear and the minor gear of the posterior speed-changing gear engage with the active component and driven component, respectively.

A circumference product of every minor gear of the speed-changing gear being divided by a circumference product of every major gear of the speed-changing gear; a circumference of the active component being divided by a circumference of the first rolling component; and a circumference of the second rolling component being divided by a circumference of the driven component; the product of all three ratios is less than one in order to make the second displacement smaller than the first displacement.

The elastic component further includes an elasticity-adjusting component in order to control the elasticity of the elastic component through adjusting the length of the elastic component. The elasticity-adjusting component includes a clam and a distance-adjusting component. One end of the elastic component is connected to the second cable. The clam is connected to the opposite end of the elastic component. The both terminals of the distance-adjusting component are respectively connected to the clam and the elastic component of the holding component in order to adjust the distance between the clam and the holding component.

The height adjustable holding apparatus further includes a displacement-limiting device being disposed in the holding component, wherein the displacement-limiting device limits the moving component to a range between the first rolling component and the elastic component.

DETAILED DESCRIPTION OF THE PREFERRED EMBODIMENT

Figure 1:
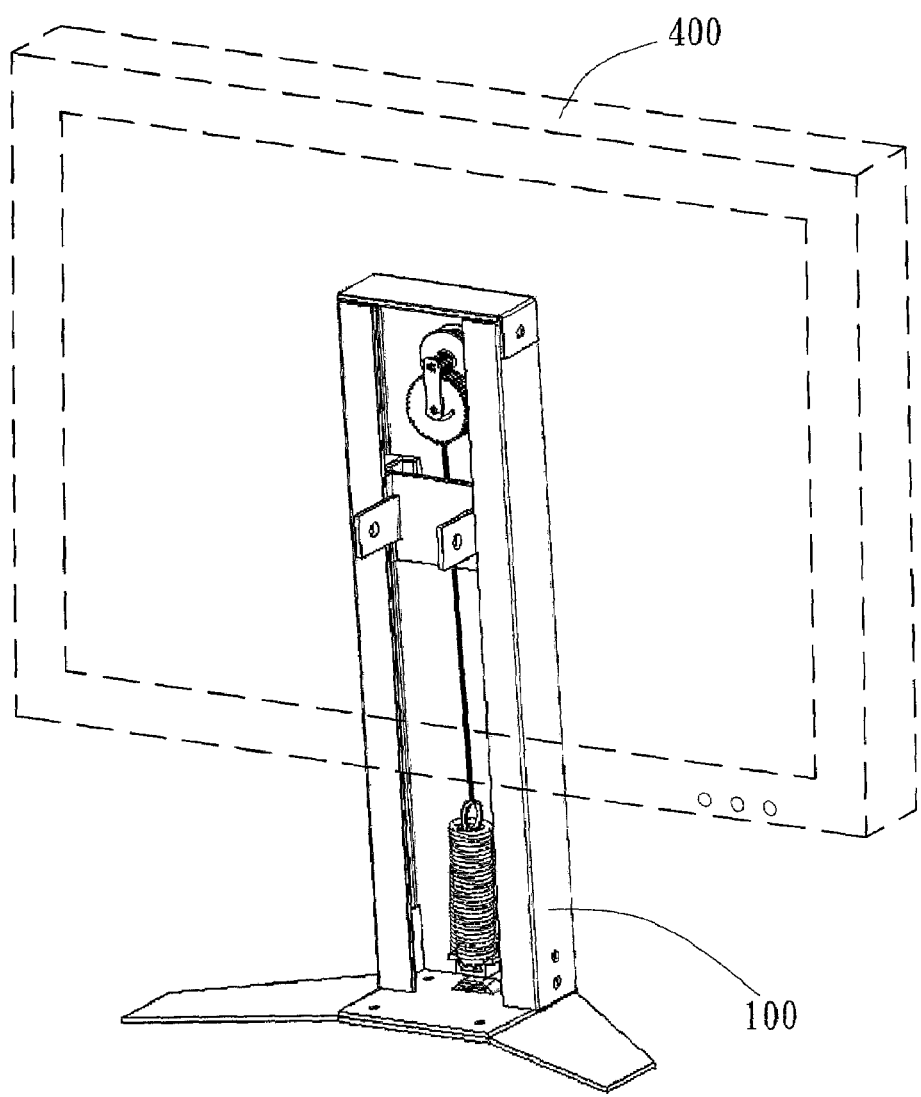
FIG. 1 is a schematic diagram of an embodiment of the present invention.

The present invention provides a height adjustable holding apparatus for supporting an object. In the preferred embodiment shown in FIG. 1, an object 400 is a display, wherein the height adjustable holding apparatus 100 is a holding component of the display. However, in other embodiments, the height adjustable holding apparatus 100 can be a holding component of the TV displayer or other objects.

Figure 2:
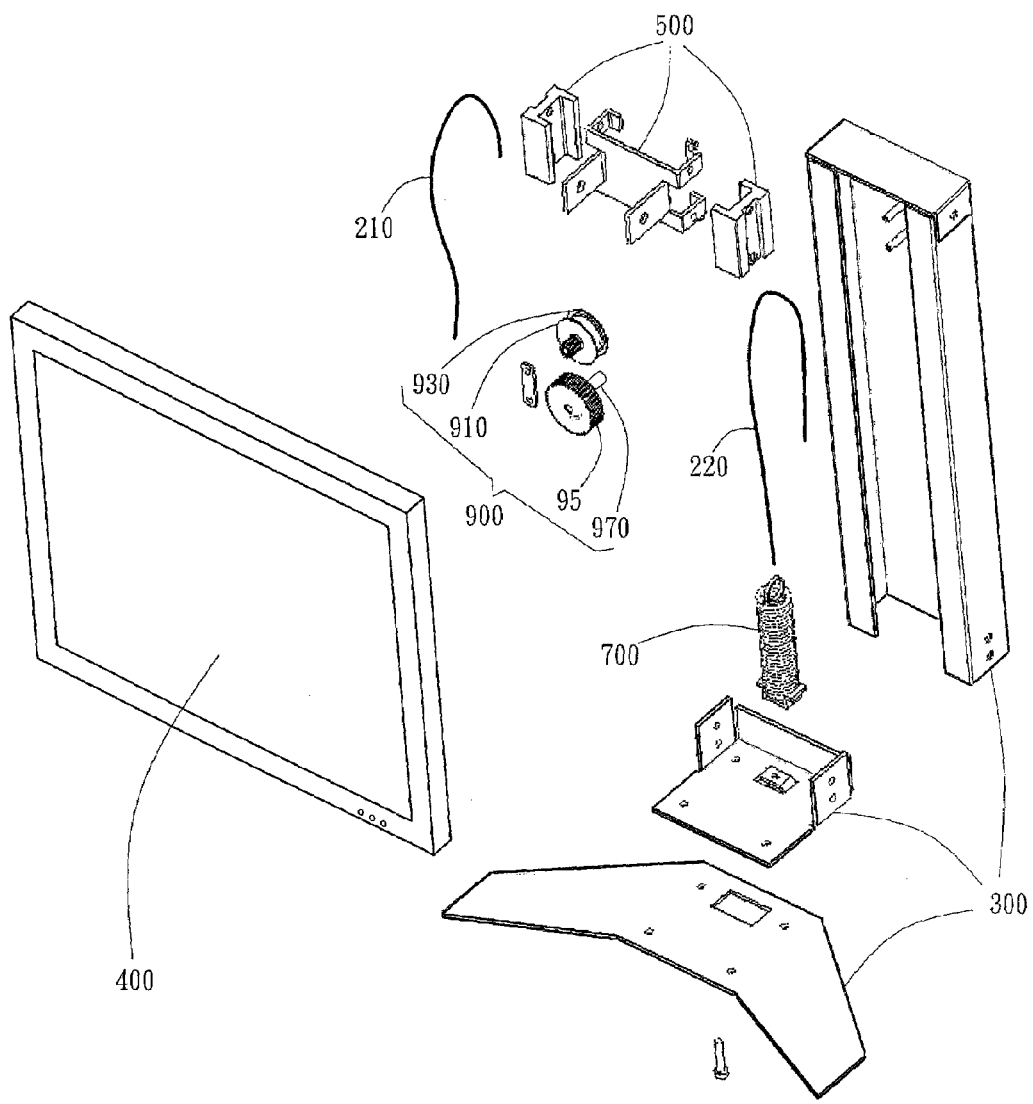
FIG. 2 is an explosive diagram of the present invention.

The preferred embodiment of the explosive diagram shown in FIG. 2, wherein the height adjustable holding apparatus 100 includes a holding component 300, a moving component 500, an elastic component 700, an active component 910, a first rolling component 930, a driven component 950, a second rolling component 970, a first cable 210 and a second cable 220. The moving component 500 is disposed along the holding component 300, wherein the moving component 500 connects with an object 400 being movable along the holding component 300. The elastic component 700 is disposed in one end of the holding component 300 and being stretchable along the direction of the moving component 500.

The active component 910 is disposed on the holding component 300. The first rolling component 930 is disposed on the holding component 300, wherein the first rolling component 930 rotates together with the active component 910 and drives the active component 910. The driven component 950 is disposed on the holding component 300, wherein the driven component 950 rotates together with the active component 910. The second rolling component 970 is disposed on the holding component 300, wherein the second rolling component 970 rotates together with the driven component 950. In the preferred embodiment, the active component 910 and the driven component 950 are gears, wherein the active component 910 engages and rotates together with the driven component 950.

Figure 3:
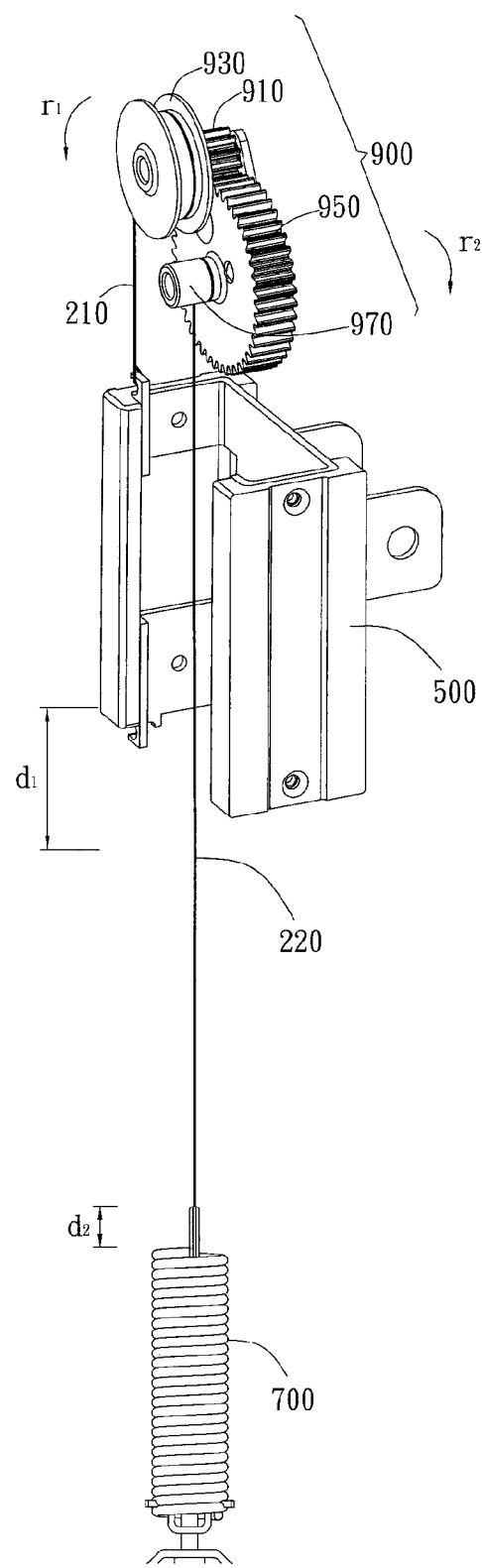
FIG. 3 is a schematic diagram of the preferred embodiment of the present invention from different angle.

FIG. 3 is a schematic diagram of the preferred embodiment of the present invention from different angle. With reference to FIG. 3, one end of the first cable 210 is connected to the moving component 500 and the other end of the first cable 210 is connected to a side of the first rolling component 930, wherein the first rolling component 930 is able to roll back the first cable 210. One end of the second cable 220 is connected to a side of the second rolling component 970 and the other end of the second cable 220 is connected to the elastic component 700.

With reference to FIG. 3, when the moving component 500 generates a first displacement $d_1$, the first cable 210 drives the first rolling component 930 so as to rotate along the direction $r_1$ and to make the active component 910 rotate along the direction $r_1$. Besides, the active component 910 rotates together with the driven component 950 so as to make the driven component 950 rotate along the direction $r_2$ and to make the second rolling component 970 roll back the second cable 220, wherein the elastic component 700 generates a second displacement $d_2$. However, in other embodiments, the moving component 500 is able to move upward so as to generate a first displacement $d_1$ and to make the elastic component 700 contract to generate the second displacement $d_2$.

The displacement-decreasing effect of the moderation gear chain 900 is generated by the cooperation of the active component 910, the first rolling component 930, the driven component 950 and the second rolling component 970. In the preferred embodiment, a product of a circumference of the active component 910 being divided by a circumference of the first rolling component 930 and a circumference of the second rolling component 970 being divided by a circumference of the driven component 950 is less than one and can be presented as:

$$\left( \frac{\text{the circumference of the active component 910}}{\text{the circumference of the first rolling component 930}} \times \frac{\text{the circumference of the second rolling component 970}}{\text{the circumference of the driven component 950}} \right) < 1$$

In other words, when the moving component 500 moves one unit of displacement, the first rolling component 930 rotates so as to generate one unit of the corresponding displacement, wherein the corresponding displacement generated by the second rolling component 970 is less than one unit because of the relative circumference. Therefore, the relative displacement of the elastic component 700 is less than one unit. By doing so, generating a displacement-decreasing effect makes the second displacement $d_2$ less than the first displacement $d_1$.

In the height adjustable holding apparatus 100 of the present invention, the sum of the gravity force of the moving component 500 and object 400 and the friction force among the moving component 500, the holding component 300, the first cable 210, the second cable 220 and the moderation gear chain 900 are equal to the tensile force of the elastic component 700 in order to achieve static equilibrium and to have the moving component 500 and the object 400 static. Because the tensile force of the elastic component 700 positively correlates with the displacement of the elastic component 700, the smaller displacement of the elastic component 700 generates less difference of tensile force. Thus, by the displacement-decreasing effect, the elastic component 700, when the moving component 500 generates a displacement, generates a smaller displacement and little difference of tensile force to achieve static equilibrium among the gravity, friction and tensile force, wherein the moving component 500 is static even after moving the first displacement in order to achieve the height adjustable holding effect of the object 400. Because the elastic component 700 does not use the constant-force spring, the material cost of the constant-force spring can be saved.

Figure 4:
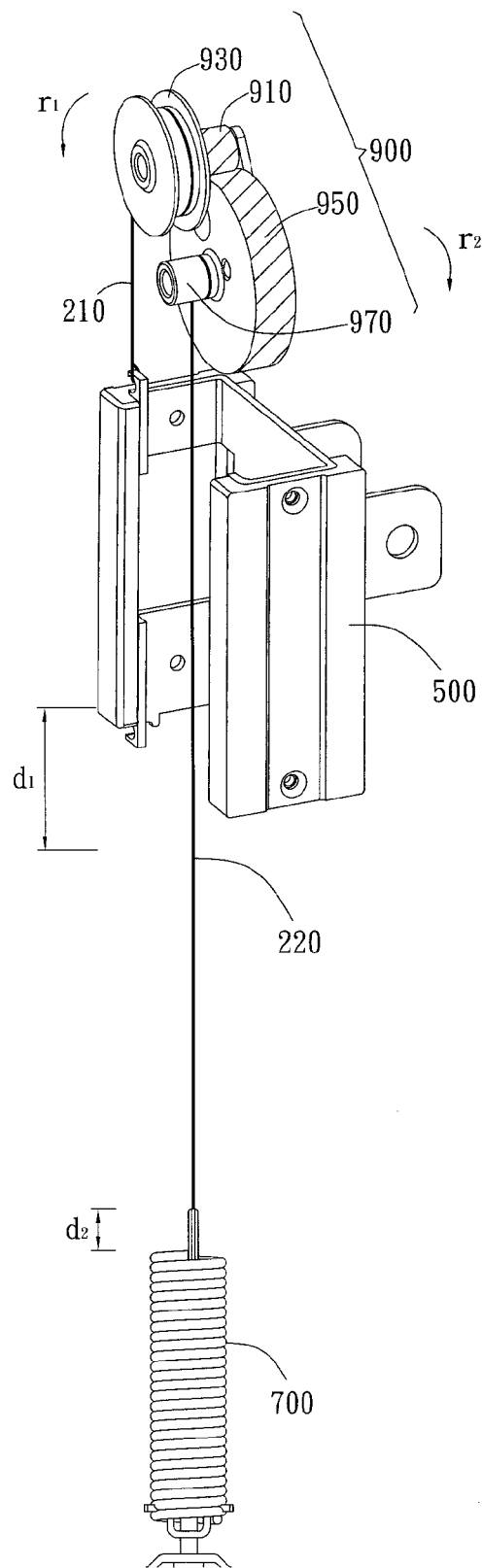
FIG. 4 is a schematic diagram of the other embodiment of the moderation gear set of different disposition.
Figure 5:
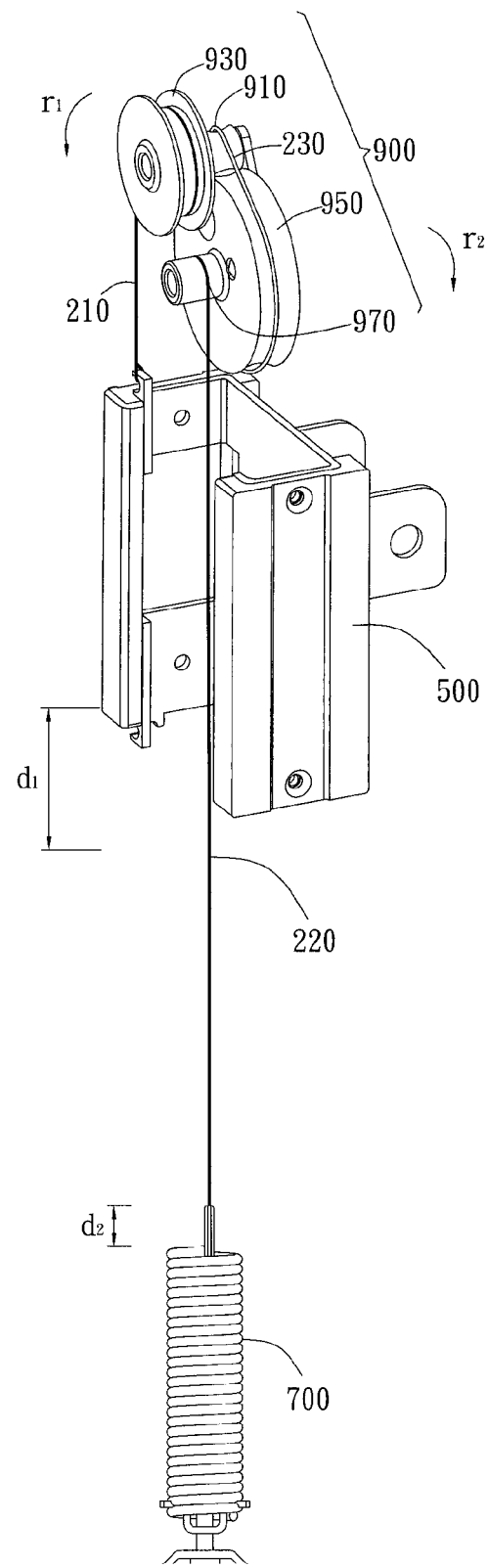
FIG. 5 is a schematic diagram of another embodiment of the moderation gear set of different disposition.

In the preferred embodiment shown in FIG. 3, the active component 910 and the driven component 950 are gears engaging with each other. However, in other embodiments, the active component 910 and the driven component 950 can perform the same function through other sets in order to achieve the rotating together effect. In the other embodiment shown in FIG. 4, the circumferences of the active component 910 and the driven component 950 include the high friction material such as adhesive string, wherein the circumference of the active component 910 and the circumference of the driven component 950 contact with each other. Thus, when one of the circumferences rotates, the friction between both circumferences will drive the other of circumference to rotate together. In another embodiment shown in FIG. 5, the active component 910 and the driven component 950 are pulleys, wherein the active component 910 and the driven component 950 are driven by a third cable 230 to rotate together. On the other hand, when one of active component 910 and the driven component 950 rotates, the third cable 230 and the friction of the circumference of the active component 910 and the driven component 950 will drive the active component 910 to rotate together with the driven component 950.

The height adjustable holding apparatus 100 of the present invention further includes a speed-changing gear set. The speed-changing gear set includes a speed-changing gear, wherein each speed-changing gear has a major gear and a minor gear rotating together, each minor gear of the speed-changing gear engages with the major gear of the adjacent speed-changing gear, the major gear of the anterior speed-changing gear and the minor gear of the posterior speed-changing gear engage with the active component 910 and driven component 950, respectively. Wherein, a circumference product of every minor pulley of the speed-changing pulley being divided by a circumference product of every major pulley of the speed-changing pulley; a circumference of the active component 910 being divided by a circumference of the first rolling component 930; and a circumference of the second rolling component 970 being divided by a circumference of the driven component 950; the product of all three ratios is less than one in order to make the second displacement $d_2$ smaller than the first displacement $d_1$.

Figure 6:
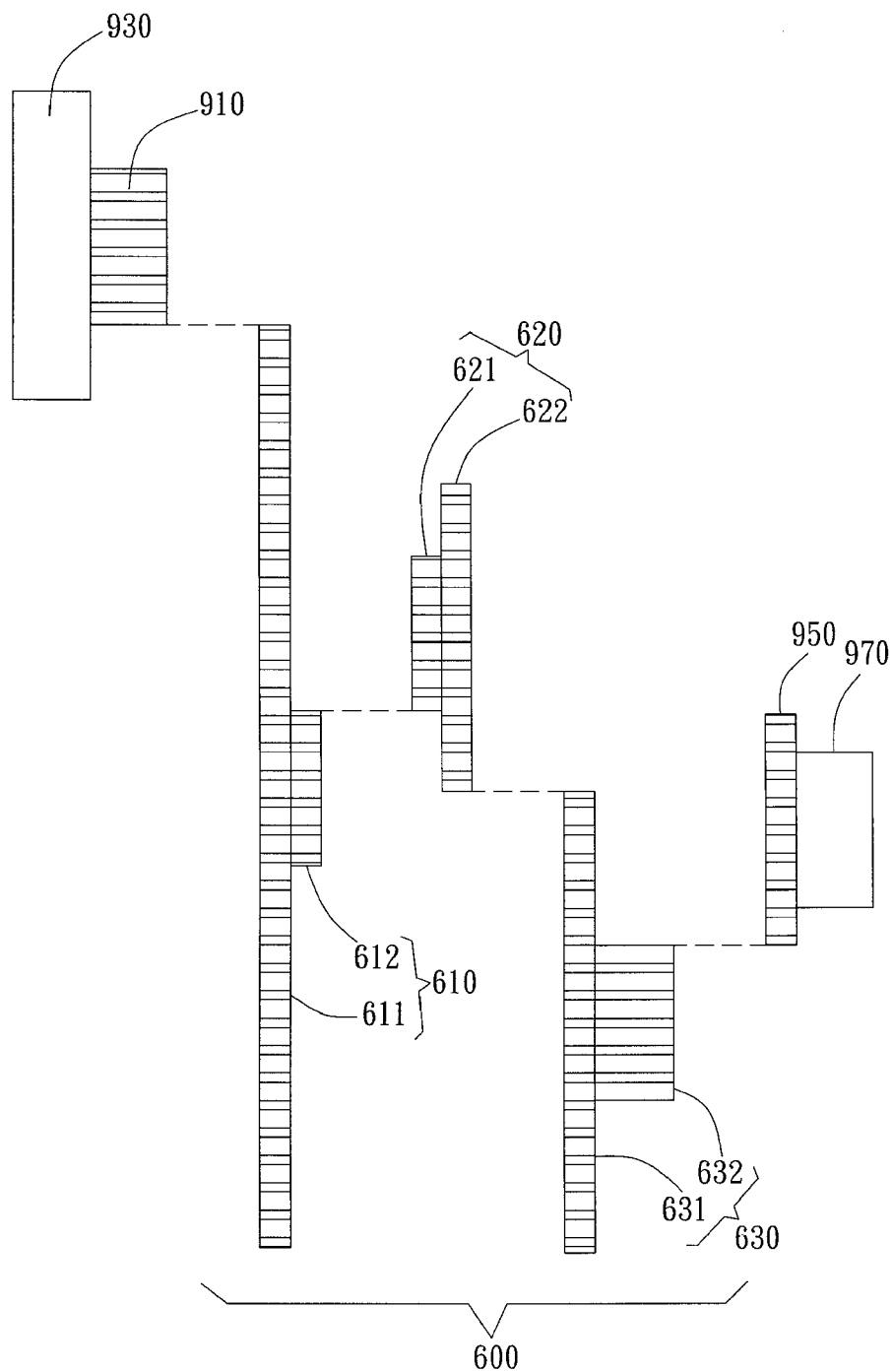
FIG. 6 is a lateral view figure of embodiment of speed-changing gear set of the present invention.

In the lateral view figure of the embodiment shown in FIG. 6, the speed-changing gear set 600 includes a first speed-changing gear 610, a second speed-changing gear 620 and a third speed-changing gear 630. The first speed-changing gear 610 includes a first speed-changing major gear 611 and a first speed-changing minor gear 612. The second speed-changing gear 620 includes a second speed-changing major gear 621 and a second speed-changing minor gear 622. The third speed-changing gear 630 includes a third speed-changing major gear 631 and a third speed-changing minor gear 632, wherein the first speed-changing major gear 611 engages with the active component 910, the third speed-changing minor gear 632 engages with the driven component 950.

In the embodiment shown in FIG. 6, the circumferences of the first rolling component 930, the active component 910, the first speed-changing major gear 611, the first speed-changing minor gear 612, the second speed-changing major gear 621, the second speed-changing minor gear 622, the third speed-changing major gear 631, the third speed-changing minor gear 632, the driven component 950 and the second rolling component 970 are 2, 1, 6, 1, 1, 5, 3, 1, 1.5, and 1 unit.

The cooperation among the active component 910, the first rolling component 930, the driven component 950, the second rolling component 970 and the every speed-changing gear of the speed-changing gear set 600 generates a displacement-decreasing effect from the cooperation between the moderation gear chain 900 and the speed-changing gear set 600. In the embodiment, the displacement-decreasing effect generated by the cooperation of moderation gear chain 900 and the speed-changing gear set 600 can be presented as following:

$$\frac{\text{the circumference of the active component } 910}{\text{the circumference of the first rolling component } 930} \times$$

$$\left[\frac{\text{the circumference product of every speed-changing minor gear}}{\text{the circumference product of every speed-changing major gear}}\right] \times$$

$$\frac{\text{the circumference of the second rolling component } 970}{\text{the circumference of the driven component } 950} =$$

$$\frac{1}{2} \times \left(\frac{1}{i} \times \frac{2}{1} \times \frac{1}{1}\right) \times \frac{1}{1.5} = \frac{1}{27}$$

on the other hand, when the first rolling component 930 rotates and generates one unit of the rotating displacement, the second rolling component generates a $\frac{1}{27}$ unit of the relative rotating displacement. By doing so, increasing the displacement-decreasing effect makes the second displacement $d_2$ smaller than the first displacement $d_1$.

In the embodiment described above, the height adjustable holding apparatus 100 of the present invention increases the displacement-decreasing effect through the speed-changing gear set 600. However, in other embodiments, the height adjustable holding apparatus 100 of the present invention increases the displacement-decreasing effect through a speed-changing pulley set.

The speed-changing pulley set includes a speed-changing pulley, each speed-changing pulley includes a major pulley and a minor pulley rolling together, each minor pulley of the speed-changing pulley rolls together with the each major pulley of the adjacent speed-changing pulley, the major pulley of the anterior speed-changing pulley and the minor pulley of the posterior speed-changing pulley roll together with the active component and driven component, respectively. Wherein: a circumference product of every minor pulley of the speed-changing pulley being divided by a circumference product of every major pulley of the speed-changing pulley; a circumference of the active component being divided by a circumference of the first rolling component; and a circumference of the second rolling component being divided by a circumference of the driven component; the product of all three ratios is less than one in order to make the second displacement $d_2$ smaller than the first displacement $d_1$.

Figure 7:
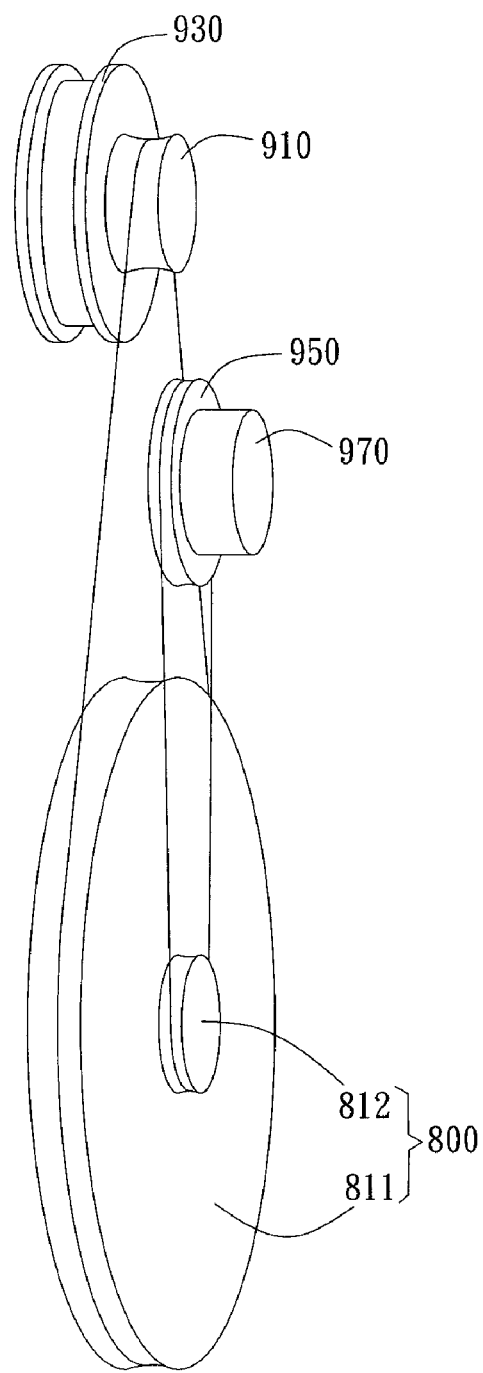
FIG. 7 is a lateral view and three-dimensional figure of the embodiment of speed-changing pulley set of the present invention.

In a lateral view and three-dimensional figure of the embodiment shown in FIG. 7, the speed-changing pulley set 800 includes a first speed-changing major pulley 811 and a first speed-changing minor pulley 812. In the embodiment shown in FIG. 7, the circumferences of the first rolling component 930, the active component 910, the first speed-changing major pulley 811, the first speed-changing minor pulley 812, the driven component 950 and the second rolling component 970 are 2, 1, 6, 1, 1.5 and 1 unit.

The cooperation among the active component 910, the first rolling component 930, the driven component 950, the second rolling component 970 and the every speed-changing pulley of the speed-changing pulley set 800 generates a displacement-decreasing effect from the cooperation between the moderation gear chain 900 and the speed-changing pulley set 800. In the embodiment, the displacement-decreasing effect generated by the cooperation of moderation gear chain 900 and the speed-changing pulley set 800 can be presented as following:

$$\frac{\text{the circumference of the active component 910}}{\text{the circumference of the first rolling component 930}} \times$$

$$\frac{\text{the circumference of the first speed-changing minor pulley}}{\text{the circumference of the first speed-changing major pulley}} \times$$

$$\frac{\text{the circumference of the second rolling component 970}}{\text{the circumference of the driven component 950}} =$$

$$\frac{1}{2} \times \frac{1}{6} \times \frac{1}{1.5} = \frac{1}{18}$$

On the other hand, when the first rolling component 930 rotates and generates one unit of the rotating displacement, the second rolling component generates a 1/18 unit of the relative rotating displacement. By doing so, increasing the displacement-decreasing effect makes the second displacement $d_2$ smaller than the first displacement $d_1$.

Figure 8:
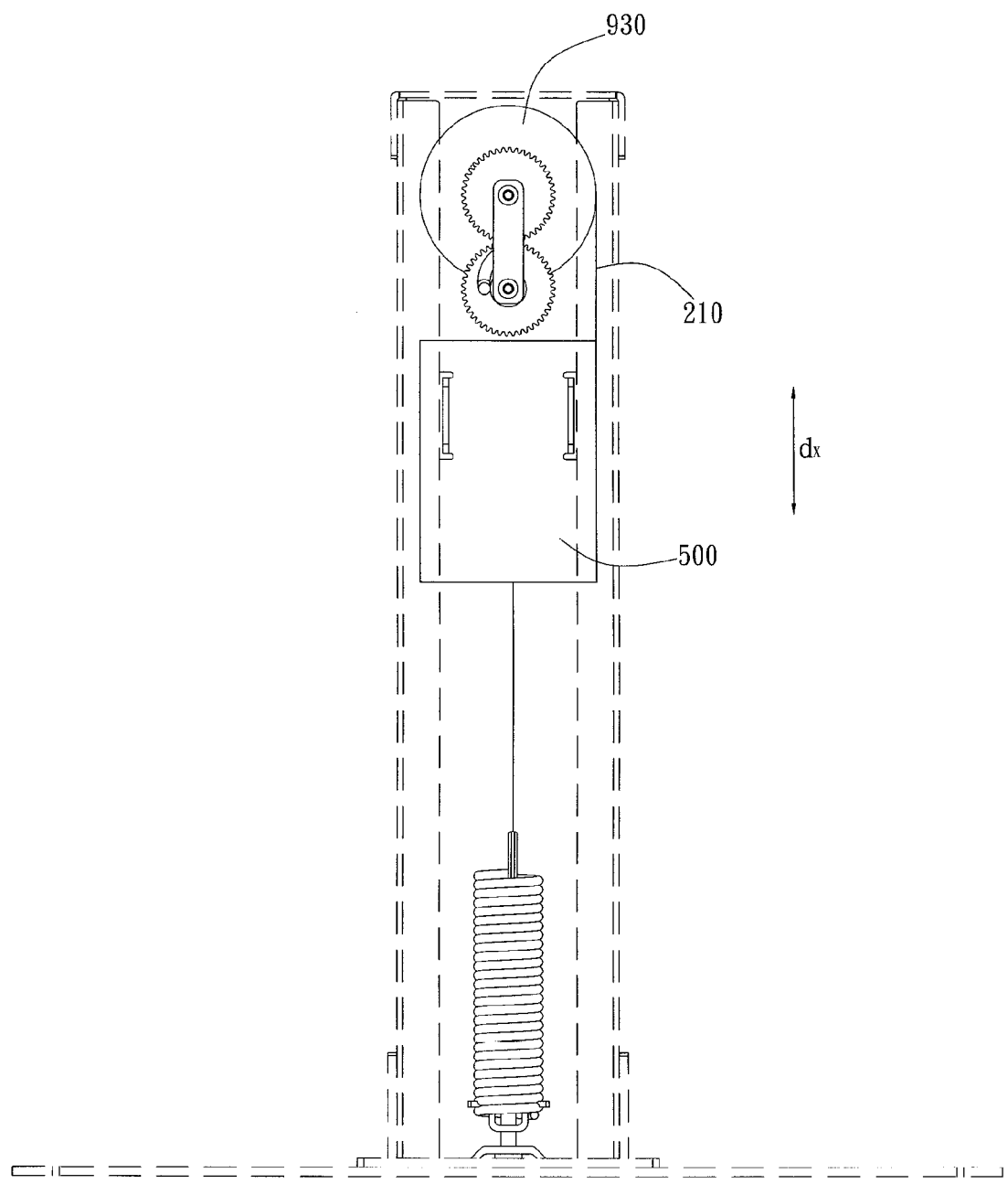
FIG. 8 is a schematic diagram of the first rolling component of other circumference of the present invention.

In the embodiment shown in FIG. 8, the disposition and the circumference size of first rolling component 930 makes the first cable 210 rolling the lateral side of the first rolling component 930 move along the direction $d_x$ of the moving component 500. By doing so, a component of force, due to the non-parallel direction between the first cable 210 and the moving component 500, can be prevented and the component of force will result in the decrease of the direct force of the first cable 210 toward the moving component 500.

Figure 9:
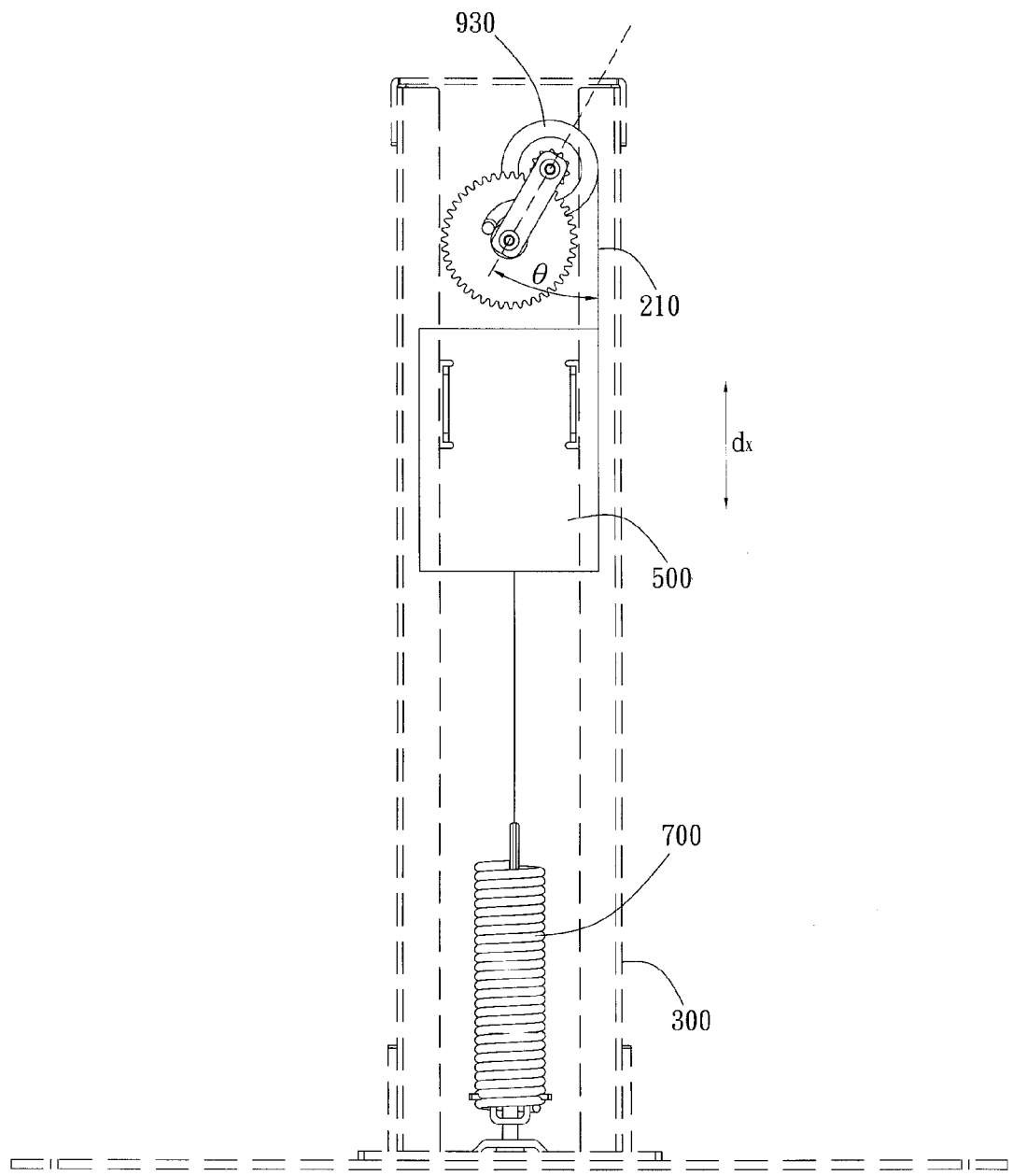
FIG. 9 is a schematic diagram of the first rolling component of other disposition of the present invention.
Figure 10:
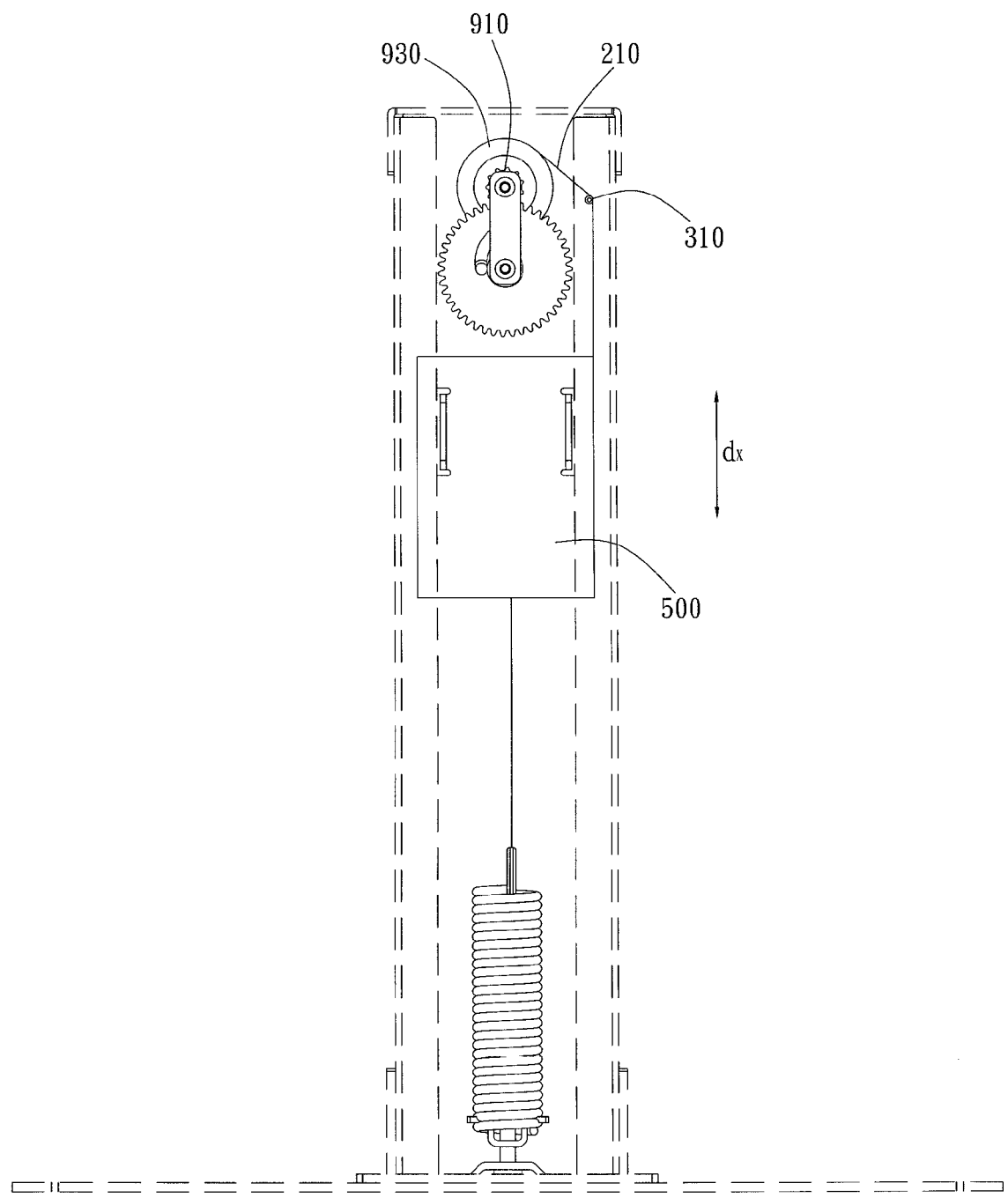
FIG. 10 is a schematic diagram of the embodiment with holding part of the present invention.

In the embodiment shown in FIG. 9, in order to prevent the component of force generated due to the non-parallel direction between the first cable 210 and the moving component 500, the disposition center of the active component 910 and the driven component 950 form a line, the line relative to the direction of the moving component 500 is able to forms an angle θ in order to make the first cable 210 move along the direction $d_x$ of the moving component 500. Besides, in the embodiment shown in FIG. 10, the holding part 310 can be used for the same purpose. The holding part 310 is disposed in the holding component 300 and is relative to the active component 910 in order to make the first cable 210 move along the direction $d_x$ of the moving component 500 through the holding part 310.

In the preferred embodiment, the elastic component 700 further includes an elasticity-adjusting component 710 in order to control the tensile force of the elastic component 700 through adjusting the length of the elastic component 700. In the preferred embodiment shown in FIG. 11, the elasticity-adjusting component 710 includes a clam 711 and a distance-adjusting component 713. One end of the elastic component 700 is connected to the second cable 220. The clam 711 is connected to the opposite end of the elastic component 700. The both terminals of the distance-adjusting component 710 are respectively connected to the clam 711 and the elastic component 700 of the holding component 300 in order to adjust the distance between the clam 711 and the holding component, wherein the length of the elastic component 700 is stretchable in order to control the tensile force of the elastic component 700.

Figure 11:
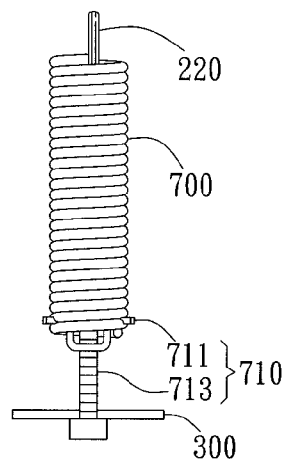
FIG. 11 is a schematic diagram of the elasticity-adjusting component of the present invention.

In the preferred embodiment shown in FIG. 11, the distance-adjusting component 713 can be a screw. The screw of the distance-adjusting component 713 pierces through the clam 711 and one end of the elastic component 700 of the holding component 300, wherein the cap of the screw is disposed in one end of the elastic component 700 of the holding component 300. By rotating the screw of the distance-adjusting component 713, the distance of one end of the elastic component 700 of the holding component 300 and the clam 711 is able to be changed, wherein the length of the elastic component 700 is stretchable in order to control the tensile force of the elastic component 700.

Figure 12:
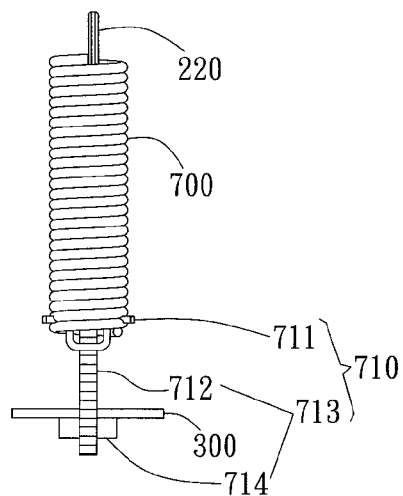
FIG. 12 is a schematic diagram of the elasticity-adjusting component of the other embodiment of the present invention.

The distance-adjusting component 713 can perform the same function through other embodiments to adjust the distance between the clam 711 and the holding component 300, the length of the elastic component 700 is stretchable in order to control the tensile force of the elastic component 700. In the embodiment shown in FIG. 12, the distance-adjusting component 713 includes a second screw 712 and a cap of screw 714, wherein the second screw 712 pierces through the clam 711 and one end of the elastic component 700 of the holding component 300, the cap of the screw 714 is disposed on the tail of the second screw 712, by rotating the cap of the screw 714, the distance between the clam 711 and one end of the elastic component 700 of the holding component 300 is able to be changed, wherein the length of the elastic component 700 is stretchable in order to control the tensile force of the elastic component 700.

Figure 13:
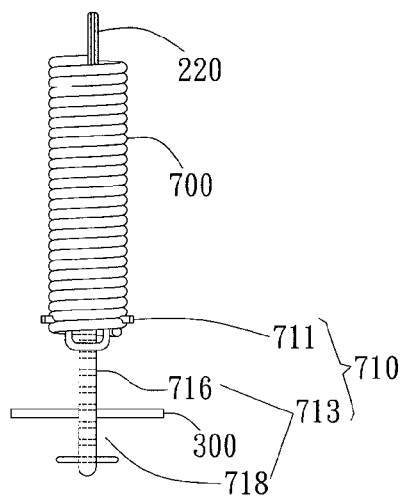
FIG. 13 is a schematic diagram of the elasticity-adjusting component of another embodiment of the present invention.

In the embodiment shown in FIG. 13, the distance-adjusting component 713 includes a die part 718 and a plate part 716, wherein the plate part 716 has a plurality of pores, one end of the plate part 716 is connected to the clam 711, the opposite end of the plate part 716 pierces one end of the elastic component 700 of the holding component 300. By changing the disposition on the plate part 716 pierced by the die part 718, the distance between the clam 711 and one end of the elastic component 700 of the holding component 300 is able to be changed, wherein the length of the elastic component 700 is stretchable in order to control the tensile force of the elastic component 700.

Figure 14:
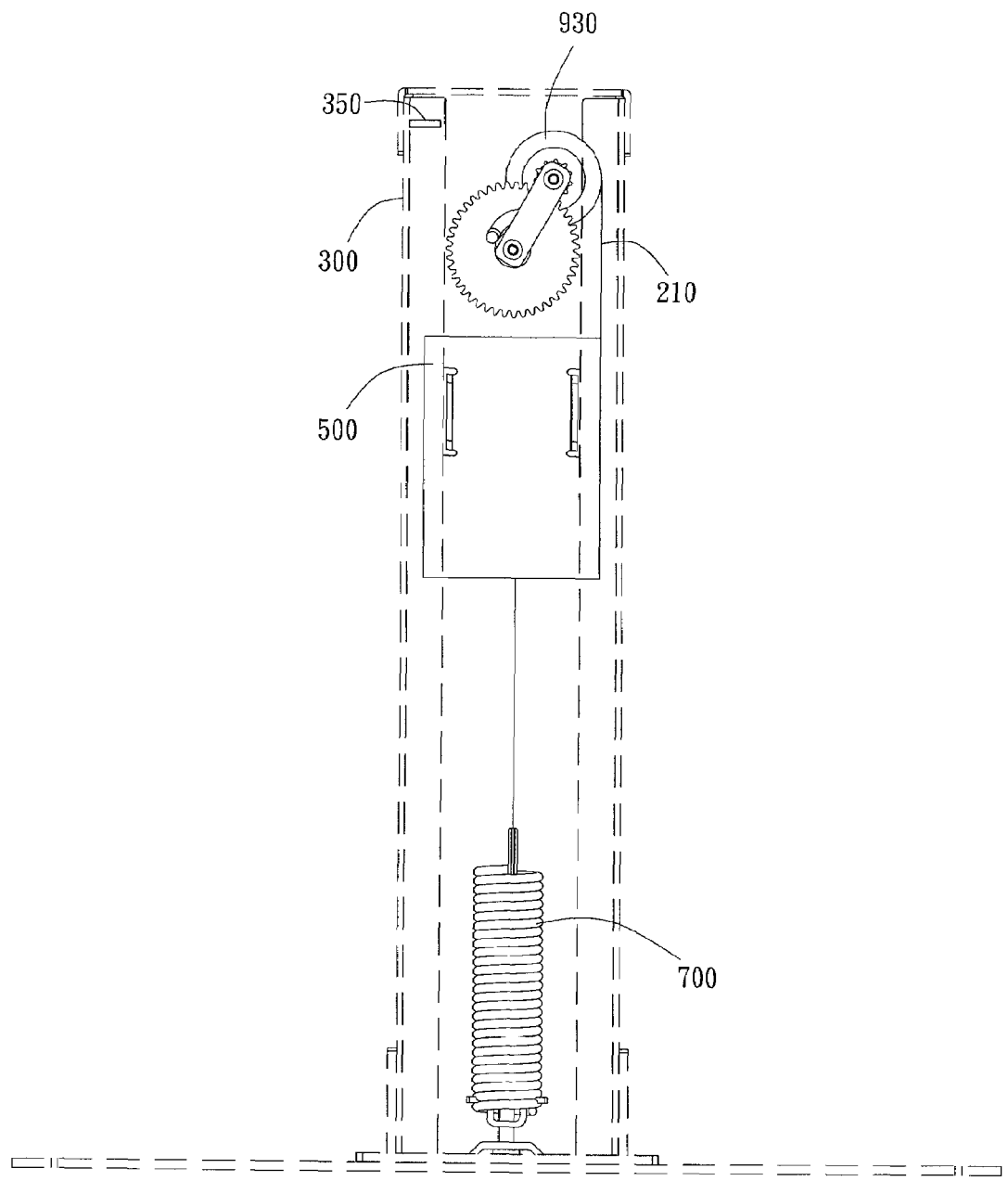
FIG. 14 is a schematic diagram of the embodiment with displacement-limiting device of the present invention.

The height adjustable holding apparatus 100 of the present invention further includes a displacement-limiting device 350 disposed in the holding component 300, wherein the displacement-limiting device 350 limits the moving component 500 to a range between the first rolling component 930 and the elastic component 700. In the embodiment shown in FIG. 14, the displacement-limiting device 350 is disposed in the interior lateral side of the holding component 300 between the elastic component 700 and the top of the first rolling component 930. When the moving component 500 moves along the direction of the first rolling component 930 toward the displacement-limiting device 350, the displacement of the moving component 500 will be limited by the displacement-limiting device 350. Because the weight of the moving component 500 and the object 400 is supported by the tensile force of the first cable 210, it is preventable for the moving component 500 to pass through the top of the first rolling component 930 and to lose the tensile force supporting the weight of moving component 500 and the object 400, wherein the direction of tensile force of the first cable 210 changes. In the preferred embodiment, the displacement-limiting device 350 is a baffle. However, in other embodiments, the displacement-limiting device 350 can be other forms such as cylinder or protuberances.

In the height adjustable holding apparatus 100 of the present invention, the gravity of the moving component 500 and object 400 and the friction among the moving component 500, holding component 300, the first cable 210, the second cable 220 the active component 910, the first rolling component 930, the driven component 950, and the second rolling component 970 are equal with the tensile force of the elastic component 700 in order to achieve static equilibrium and to have the moving component 500 and the object 400 static. In summary, when the moving component 500 generates a displacement, the elastic component 700 will generate a smaller displacement and a tensile force. Because the tensile force is equal with the gravity and friction to achieve static equilibrium, the moving component 500 is able to be a static state so as to complete the height adjustable holding effect of the object 400. Wherein, the elastic component 700 does not use the constant-force spring, by doing so, the present invention can save the material cost of the constant-force spring.

Figure 15:
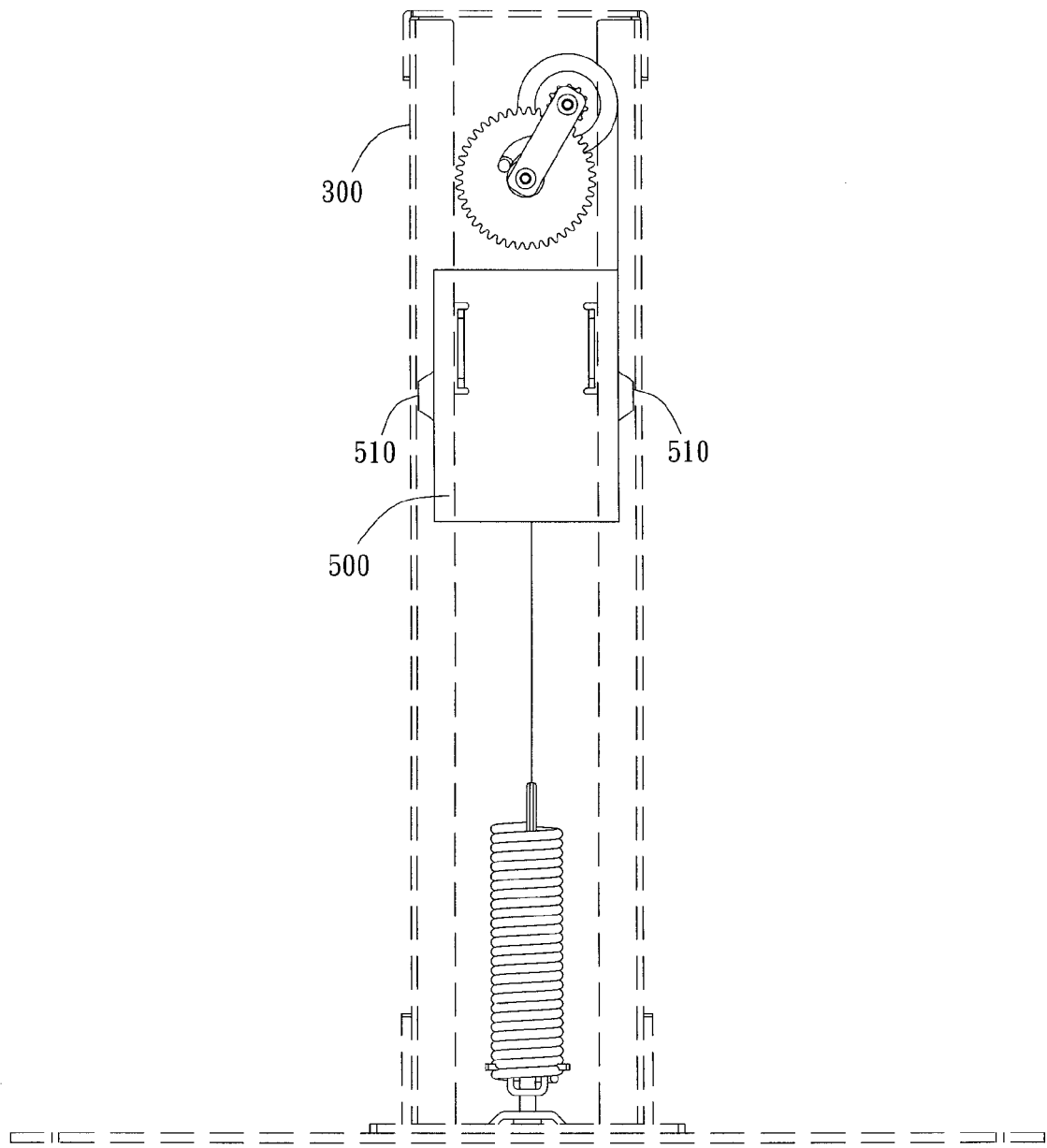
FIG. 15 is a schematic diagram of the embodiment with friction component of the present invention.

Besides, the height adjustable holding apparatus 100 further increases the friction between the moving component 500 and the holding component 300 in order to increase the supporting force. In the preferred embodiment shown in FIG. 15, the height adjustable holding apparatus 100 of the present invention further includes a friction component 510 disposed between the moving component 500 and holding component 300 in order to augment the friction between the moving component 500 and the holding component 300. In the preferred embodiment, the friction component 510 is a reed. However, in other embodiments, the friction component 510 can be other embodiments such as cylinder or protuberances Another embodiment shown in FIG. 16, the gear 931 rotates together with the active component 910 and drives the active component 910. The rack 211 disposed on lateral side of the moving component 500 along the direction of the moving component 500 and engaging with the gear 931.

Figure 16:
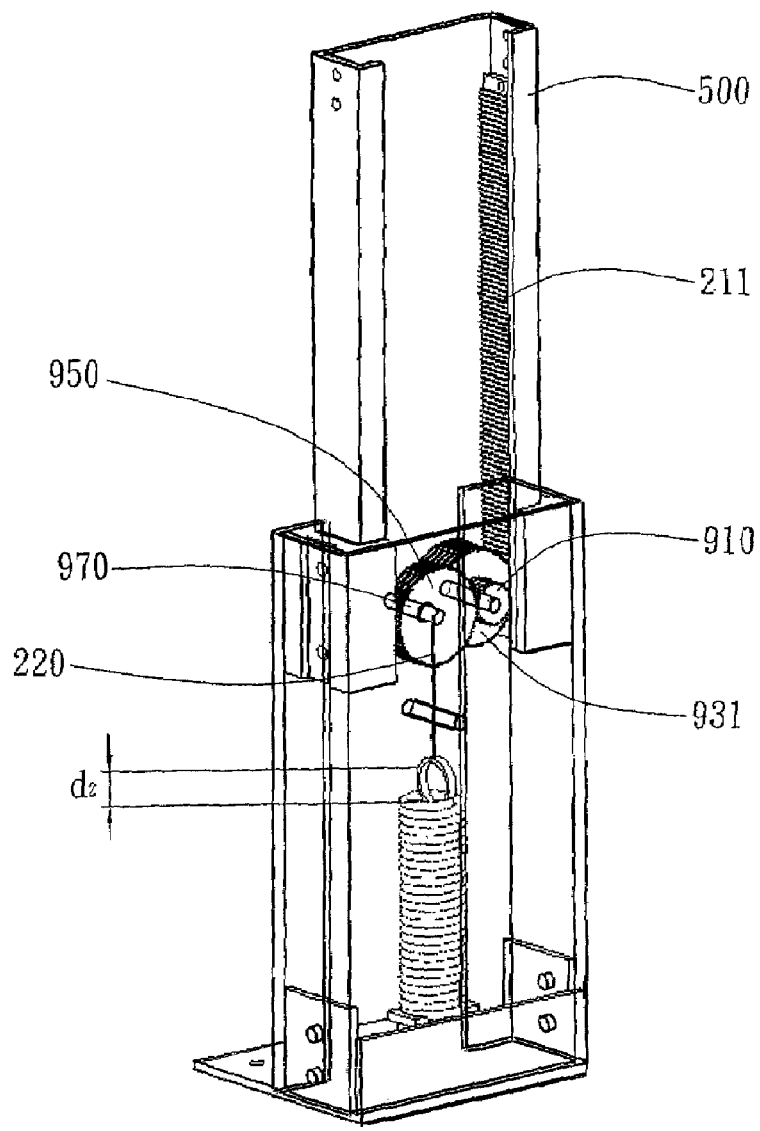
FIG. 16 is a schematic diagram of the different embodiment with the first rolling component and the first cable of the present invention.

In the preferred embodiment shown in FIG. 16, when the moving component 500 generates the first displacement $d_1$, the rack 211 drives the active component 910 and the driven component 950 to rotate together, wherein the rolling component 970 rolls back the cable 220 in order to make the elastic component 700 generate the second displacement $d_2$ smaller than the first displacement $d_1$. The elastic component 700 generates the second displacement $d_2$ led to static equilibrium among the gravity, friction, and tensile force to have the moving component 500 static and to achieve the height adjustable holding effect of the object 400. By using the rack 211, the component force problem of the first cable 210 due to the loss of the tensile force of the moving component 500 and the object 400 can be prevented in other embodiments. Besides the rack 211 can increase the displacement of the moving component 500. The height adjustable holding apparatus shown in FIG. 16 further includes a speed-changing gear set as illustrated in FIG. 6. The speed-changing gear set includes a at least one speed-changing gear, each speed-changing gear includes a major gear and a minor gear rotating together, each minor gear of the speed-changing gear engages with the major gear of the adjacent speed-changing gear, the major gear of the anterior speed-changing gear and the minor gear of the posterior speed-changing gear respectively engage with the active component 910 and driven component 950 shown in FIG. 16, wherein the use of the speed-changing gear set is taught in paragraph [0035] to [0039].

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A height adjustable holding apparatus for supporting a display comprising:
    a holding component;
    a moving component being disposed along the holding component, wherein the moving component connects to the display being movable along the holding component;
    an elastic component, wherein one end of the elastic component is connected to the holding component;
    an active component being disposed on the holding component;
    a first rolling component being disposed on the holding component, wherein the first rolling component rotates together with the active component and drives the active component;
    a driven component being disposed on the holding component, wherein the driven component rotates together with the active component;
    a second rolling component being disposed on the holding component, wherein the second rolling component rotates together with the driven component;
    a first cable, wherein one end of the first cable is connected to the moving component and the other end of the first cable is connected to the side of the first rolling component, the first rolling component is able to roll back the first cable; and
    a second cable, wherein one end of the second cable is connected to the side of the second rolling component and the other end of the second cable is connected to the other end of the elastic component, and the first cable drives the active component to rotate together with the driven component when the moving component generates a first displacement, the second rolling component rolls back the second cable and makes the elastic component to generate a second displacement smaller than the first displacement.

2. The height adjustable holding apparatus of claim 1 wherein the active component and the driven component are gears, the active component engages and rotates together with the driven component.

3. The height adjustable holding apparatus of claim 2 further including a speed-changing gear set, wherein the speed-changing gear set includes a speed-changing gear, each speed-changing gear has a major gear and a minor gear rotating together, each minor gear of the speed-changing gear engages with the major gear of the adjacent speed-changing gear, the major gear of the anterior speed-changing gear and the minor gear of the posterior speed-changing gear engage with the active component and driven component, respectively.

4. The height adjustable holding apparatus of claim 3 wherein:
    a circumference product of every minor gear of the speed-changing gear being divided by a circumference product of every major gear of the speed-changing gear;
    a circumference of the active component being divided by a circumference of the first rolling component; and
    a circumference of the second rolling component being divided by a circumference of the driven component;
    the product of all three ratios is less than one in order to make the second displacement smaller than the first displacement.

5. The height adjustable holding apparatus of claim 1 wherein the active component and the driven component are pulleys, the active component and the driven component rotate together through a third cable.

6. The height adjustable holding apparatus of claim 1 wherein a product of a circumference of the active component being divided by a circumference of the first rolling component and a circumference of the second rolling component being divided by a circumference of the driven component is less than one in order to make the second displacement smaller than the first displacement.

7. The height adjustable holding apparatus of claim 1 wherein the disposition and the circumference size of the first rolling component makes the first cable move along the direction of the moving component.

8. The height adjustable holding apparatus of claim 1 wherein the center of the active component and the driven component form a line, the line relative to the direction of the moving component forms an angle in order to make the first cable move along the direction of the moving component.

9. The height adjustable holding apparatus of claim 1 further including a holding part, wherein the holding part is disposed in the holding component and is relative to the active component in order to make the first cable move along the direction of the moving component through the holding part.

10. The height adjustable holding apparatus of claim 1 wherein the elastic component further includes an elasticity-adjusting component in order to control the elasticity of the elastic component through adjusting the length of the elastic component.

11. The height adjustable holding apparatus of claim 10, wherein one end of the elastic component connect to the second cable and the elasticity-adjusting component includes;
   a clam, wherein the clam connect to the opposite end of the elastic component; and
   a distance-adjusting component, wherein the both terminals of the distance-adjusting component are respectively connected to the clam and the holding component in order to adjust the distance between the clam and the holding component.

12. The height adjustable holding apparatus of claim 1 further including a displacement-limiting device disposed in the holding component, wherein the displacement-limiting device limits the moving component to a range between the first rolling component and the elastic component.

13. A height adjustable holding apparatus for supporting a display comprising:
   a holding component;
   a moving component being disposed along the holding component, wherein the moving component connects to the display being movable along the holding component;
   an elastic component, wherein the one end of the elastic component is connected to the holding component;
   an active component being disposed on the holding component;
   a gear being disposed on the holding component, wherein the gear rotates together with the active component and driving the active component;
   a driven component being disposed on the holding component, wherein the driven component rotates together with the active component; and
   a rolling component being disposed on the holding component, wherein the rolling component rotates together with the driven component;
   a rack disposed on the moving component along the direction of the moving component and engaging with the gear; and
   a cable, wherein the one end of the cable is connected to the side of the rolling component and the other end of the cable is connected to the other end of the elastic component, and the rack drives the active component to rotate together with the driven component when the moving component generates a first displacement, the rolling component rolls back the cable and makes the elastic component to generate a second displacement smaller than the first displacement.

14. The height adjustable holding apparatus of claim 13 wherein a product of a circumference of the active component being divided by a circumference of the gear and a circumference of the rolling component being divided by a circumference of the driven component is less than one in order to make the second displacement smaller than the first displacement.

15. The height adjustable holding apparatus of claim 13 further including a speed-changing gear set, wherein the speed-changing gear set includes at least one speed-changing gear, each speed-changing gear includes a major gear and a minor gear rotating together, each minor gear of the speed-changing gear engages with the major gear of the adjacent speed-changing gear, the major gear of the anterior speed-changing gear and the minor gear of the posterior speed-changing gear engage with the active component and driven component, respectively.

16. The height adjustable holding apparatus of claim 13 wherein the elastic component further includes an elasticity-adjusting component in order to control the elasticity of the elastic component through adjusting the length of the elastic component.

17. The height adjustable holding apparatus of claim 16 wherein the elasticity-adjusting component includes;
   a clam, wherein the clam is disposed in the opposite end of the connection between the elastic component and the second; and
   a distance-adjusting component, wherein the both terminals of the distance-adjusting component are respectively connected to the clam and the elastic component of the holding component in order to adjust the distance between the clam and one end of the elastic component of the holding component, the length of the elastic component is stretchable in order to control the elasticity of the elastic component.

18. The height adjustable holding apparatus of claim 13 further including a displacement-limiting device being disposed in the holding component, wherein the displacement-limiting device limits the moving component to a range between the gear and the elastic component.

19. An electronic device comprising:
   a display;
   a holding component;
   a moving component being disposed along the holding component, wherein the moving component connects to the display being movable along the holding component;
   an elastic component, wherein one end of the elastic component is connected to the holding component;
   an active component being disposed on the holding component;
   a first rolling component being disposed on the holding component, wherein the first rolling component rotates together with the active component and drives the active component;
   a driven component being disposed on the holding component, wherein the driven component rotates together with the active component;
   a second rolling component being disposed on the holding component, wherein the second rolling component rotates together with the driven component;
   a first cable, wherein one end of the first cable is connected to the moving component and the other end of the first cable is connected to the side of the first rolling component, the first rolling component is able to roll back the first cable; and
   a second cable, wherein one end of the second cable is connected to the side of the second rolling component and the other end of the second cable is connected to the other end of the elastic component, and the first cable drives the active component to rotate together with the driven component when the moving component generates a first displacement, the second rolling component rolls back the second cable and makes the elastic component to generate a second displacement smaller than the first displacement.

20. The electronic device of claim 19 wherein a product of a circumference of the active component being divided by a circumference of the first rolling component and a circumference of the second rolling component being divided by a circumference of the driven component is less than one in order to make the second displacement smaller than the first displacement.

* * * * *